United States Patent [19]

San Roman

[11] 4,118,322

[45] Oct. 3, 1978

[54] FILTERING APPARATUS FOR LIQUIDS

[75] Inventor: Guillermo A. San Roman, Hempstead, N.Y.

[73] Assignee: Hydrotechnic Corporation, New York, N.Y.

[21] Appl. No.: 687,365

[22] Filed: May 17, 1976

[51] Int. Cl.² ............... B01D 23/18; B01D 23/24
[52] U.S. Cl. ............................ 210/136; 210/274; 210/275; 210/293; 210/541
[58] Field of Search ............... 210/80, 81, 108, 136, 210/269, 274, 275, 293, 541

[56] References Cited

U.S. PATENT DOCUMENTS

| 826,654 | 7/1906 | Firth | 210/129 |
|---|---|---|---|
| 2,303,808 | 12/1942 | Wolcott | 210/119 |

FOREIGN PATENT DOCUMENTS 1,232,572  5/1971  United Kingdom ............... 210/275

Primary Examiner—Joseph Scovronek
Attorney, Agent, or Firm—Darby & Darby

[57] ABSTRACT

A filter for cleaning a flow of liquid including a tank divided into upper and lower chambers by a support element for a filter material bed. In one embodiment, the support element includes a corrugated plate which may be either self-supporting or supported by a header and, in another embodiment, the support element includes a flat plate supported by beam elements which in turn may be supported by the header. Another feature of the filter is the provision of an influent filter liquid inlet assembly including a self-closing passage which normally opens into the tank upper chamber and which closes when the upper tank chamber is filled to a predetermined level with backwash fluid during reverse flow backwashing of the filter bed.

9 Claims, 8 Drawing Figures

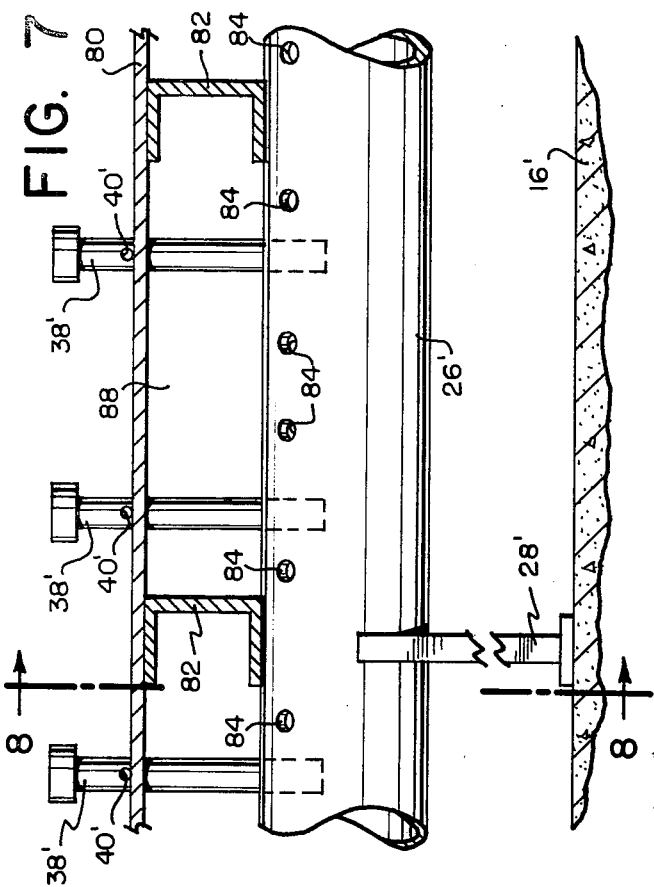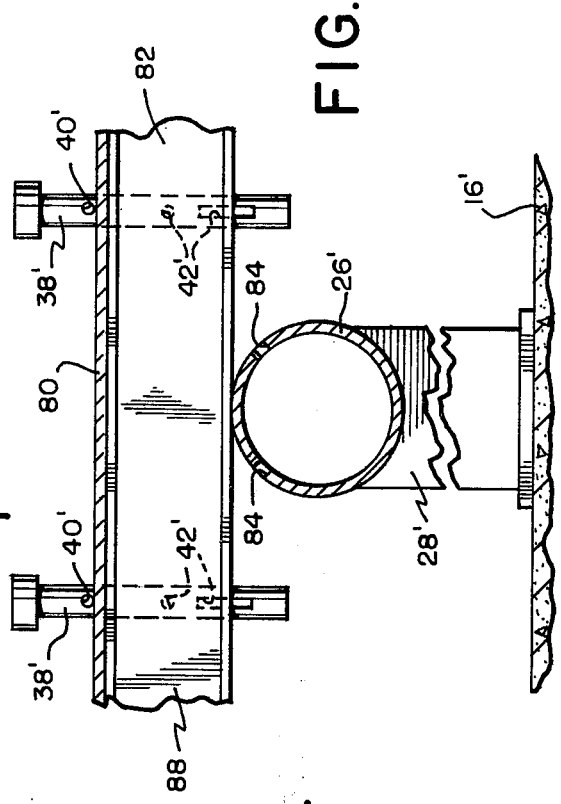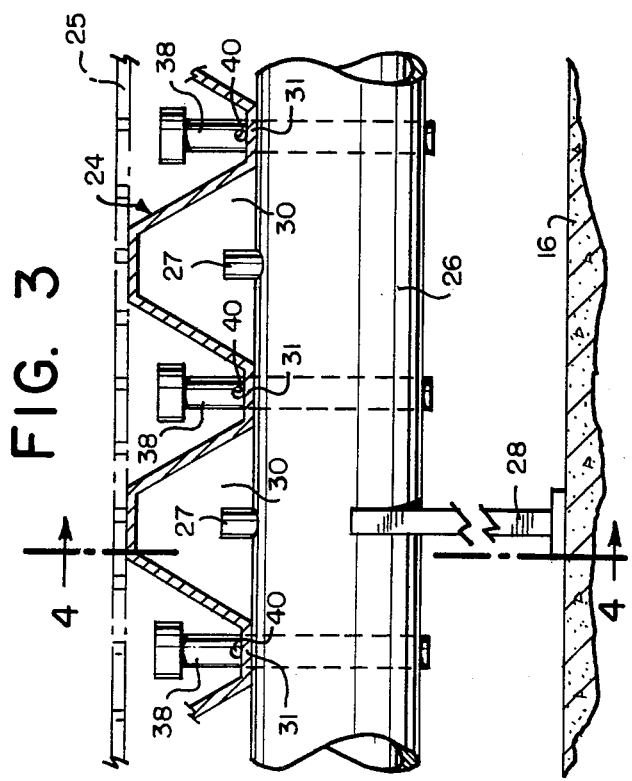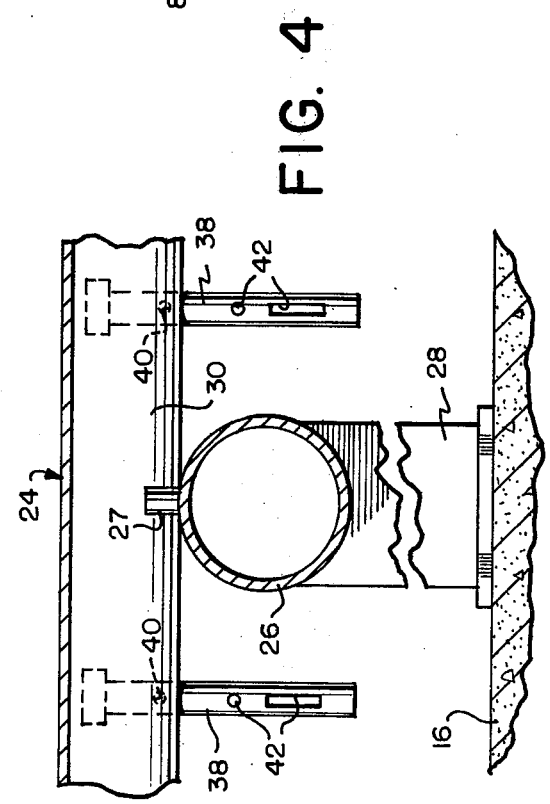

FILTERING APPARATUS FOR LIQUIDS

BACKGROUND OF THE INVENTION

This invention relates generally to filters for liquids, and more particularly, to gravity filters which employ filter beds comprising particulate filter media.

Generally, high rate gravity filters, i.e., filters designed to work at high flux rates ranging from 8 to 60 gallons per minute per square foot, include a filter bed composed of particulate filter media. The filter bed is typically supported by planar members which extend over the horizontal cross-section of the filter tank. In such systems the filter liquid is introduced into the tank above the filter bed and flows downwardly through the filter bed, through tubular extensions or the like provided in the supporting member into a chamber below the filter bed. Upon entering this lower tank chamber, the effluent filter liquid exits through an outlet provided in the lower tank chamber.

In the past, the filter bed supporting member included a flat plate which, when used in larger size filter cells, required, in addition to peripheral support flanges provided on the tank wall surfaces, a relatively bulky assembly of beams and support columns extending between the underside of the support plate and the bottom of the tank. Each support structure is quite heavy and has been a costly and time-consuming item in the manufacture of such liquid filters.

Further, such filters are usually cleaned by passing a fluid, such as water or a mixture of air and water, through the bed in a direction opposite to that used during normal filter operations. In such reverse-flow backwashing of filter beds, it is desirable to design the apparatus so that the backwash fluids (liquid and air) are evenly distributed over a horizontal cross-section of the filter bed. In an attempt to attain this goal with respect to the backwash air, a multiplicity of pipes (hereinafter referred to as secondary pipes) of varying length have been provided extending horizontally from a supply header in the lower tank chamber which uniformly distribute the air over the area of the filter bed support plate. Tubular extensions, mounted within the filter bed support plate over its entire area, distribute the backwash air delivered by the secondary pipes in a uniform manner to the filter bed through air passages found therein. However, such filters have proven to be costly since a great many of such secondary pipes are required to achieve sufficient backwash air distribution.

An additional problem encountered in the use and construction of high rate gravity filters is that at least four valves are usually required in order to control the flow of the filter and backwash liquids, namely, a first valve to control the flow of the influent, raw liquid to be filtered, a second valve to control the flow of the effluent filtered liquid, a third valve to control the flow of the influent backwash liquid and a fourth valve to control the flow of the effluent, used backwash liquid. These valves are quite expensive since they are usually equipped with mechanical, automatic command controls that require the use of delicate instrumentation and thereby raise the total cost of constructing and maintaining such filters.

Accordingly, one object of this invention is to provide a new and improved gravity liquid filter.

Another object of the present invention is to provide a new and improved filter support plate for use in gravity liquid filters which is self-supporting.

Still another object of the instant invention is to provide a new and improved apparatus for mounting a filter support plate within a liquid filter.

A further object of this invention is the provision of a new and improved filter support plate which facilitates the distribution of backwash air evenly over the filter bed.

A still further object of the instant invention is to provide a filter support plate which enables the elimination of secondary air distribution tubular extension pipes in the lower filter tank chamber.

One other object of this invention is the provision of a filter apparatus having a reduced number of required valves for controlling the flow of influent and effluent liquids.

Briefly, in accordance with one embodiment of this invention, these and other objects are attained by providing the filter bed support element in the form of a corrugated plate having alternate channels and ridges formed therein. When used for relatively small size filter cells, such plate may be self-supporting, i.e., needs no support other than at points along its periphery. Even when used for relatively large size filter cells, the corrugated plate needs only a single cross or beam support. Another feature of this invention is that in such a case, a header which normally functions as backwash air inlet, may be utilized as the cross support. Channels formed in the corrugated plate serve to uniformly distribute the backwash air delivered by the header to tubular extensions mounted in the plate for delivery to the filter bed.

In another embodiment, the header supports a plurality of crosswise extending channel beams which, in turn, support a planar filter bed support member. The crosswise beams produce the same air distribution effect as channels formed in the corrugated plate.

Yet another feature of the present invention is the provision of an influent filter liquid inlet assembly including a normally open passage for the influent raw liquid and apparatus adapted to automatically close the passage during reverse-flow backwashing of the filter bed upon the backwash fluid reaching a predetermined level in the upper tank chamber, such apparatus being actuated solely by the presence of the backwash fluid. The effluent backwash liquid outlet is located at a higher level within the upper chamber than is this influent filter liquid passage thereby disposing of the need for the previously required valves which controlled the outlet of the effluent backwash water and inlet of the raw liquid to be filtered.

DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIG. 3 is a detail view in cross-section of area A in FIG. 2 showing a filter bed support plate and cooperating structure of the present invention;

FIG. 4 is a section view taken along line 4—4 of FIG. 3;

FIG. 7 is a detail view of area B of FIG. 6 showing another filter bed support plate and cooperating structure of the present invention; and FIG. 8 is a section view taken along line 8—8 of FIG. 7.

DESCRIPTION OF THE PREFERRED EMBODIMENTS

Figure 1:
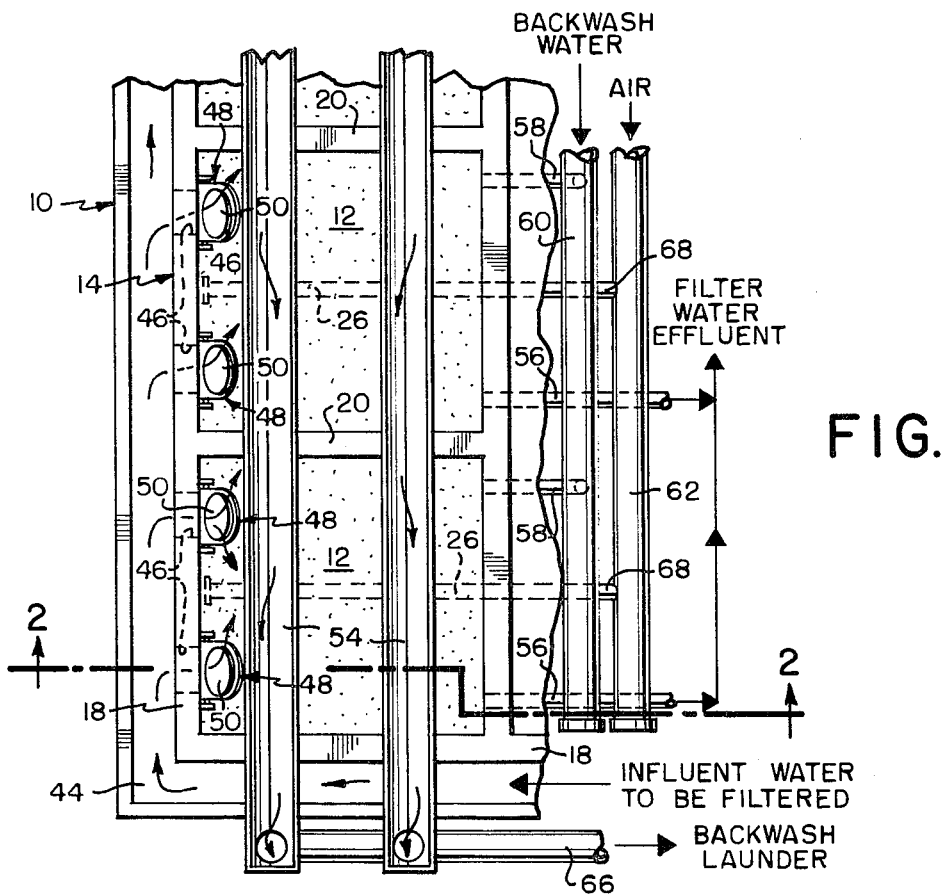
FIG. 1 is a plan view, partially broken away, of one embodiment of the liquid filter of the present invention.

Referring now to FIGS. 1-4, a liquid filter, generally denoted as 10, according to one embodiment of this invention is shown. Liquid filter 10 is illustrated as a relatively large rapid gravity filter having a multiplicity of cells 12 (2 shown in FIG. 1) designed to work at high flux rate ranging from 8 to 60 gallons per minute per square foot. However, as will become clearer hereinbelow, various features of the present invention may be employed in other size liquid filters. Further, the following description will generally make reference to a single cell 12, it being understood that additional cells may be provided having substantially identical structure and incorporating the features of the present invention.

Liquid filter 10 is generally constructed having an upstanding tank 14 of reinforced concrete construction having a bottom wall 16, outer, side walls 18 and interior partitions 20 between adjacent cells 12. It is understood that although the liquid filter cells are shown as having a square cross-sectional configuration and as being formed of concrete, other configurations and materials may be employed within the scope of the present invention.

In general, in liquid filters of this type, the raw fluid which is to be filtered (hereinafter referred to as "filter liquid") is introduced in the upper portion of tank 14 and flows through a bed of particulate filter media, such, for example, as sand or gravel, wherein entrained liquid and/or solid impurities are removed by the action of the media. The filtered liquid passes from the filter bed into the lower portion of tank 14 through appropriate passages from where it is removed. The filter bed is adapted to be cleaned by passing a fluid, such as water or a mixture of air and water, through the bed in a direction reverse of that during normal filtering operations.

Figure 2:
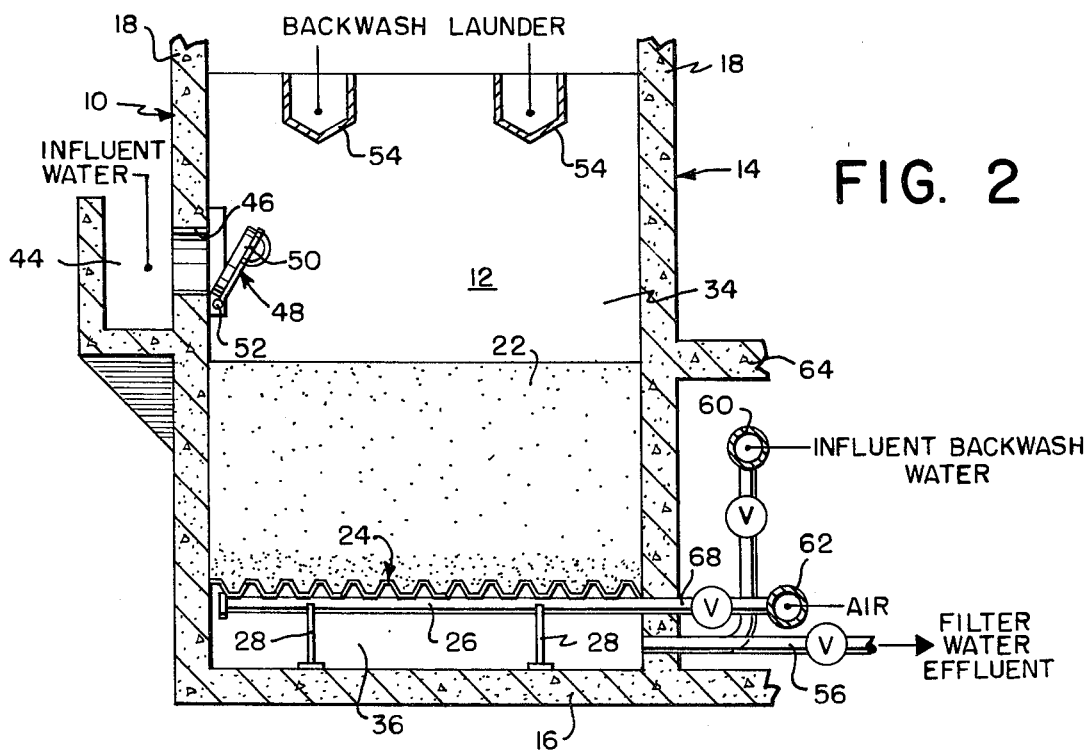
FIG. 2 is a section view taken along line 2—2 of FIG. 1.

Still referring to FIGS. 1-4, the filter bed 22 is supported within tank 14 by a filter bed support element which, in the present embodiment, comprises a corrugated plate 24, which plate comprises one feature of the present invention. As best shown in FIGS. 2-4, the corrugated filter bed support plate 24 which divides tank 14 into upper and lower chambers 34, 36, respectively, may itself be supported by at least one air header 26 which functions, as described in detail hereinbelow, as an inlet for air during the reverse-flow backwashing of the filter bed. The air header 26 is in turn supported by the upper ends of a plurality of support columns 28 whose lower ends bear against the upper surface of tank bottom wall 16. Additionally, a perforated plate or screen 25 (shown in phantom in FIG. 3) may be placed over corrugated plate 24, but such arrangement is optional.

Air header 26 provides a convenient and economical support apparatus for the filter support plate which, in the past, was usually supported by flanges formed in the cell walls and/or additional support structures. Such headers are often found in liquid filters of the type of the present invention and are employed for the introduction of air during the reverse-flow backwash of the filter bed. In the case where only a single header is provided, it preferably traverses over the horizontal cross-sectional area of the cell in the vicinity of one of the center lines thereof. The unique corrugated construction of plate 24 renders it sufficiently rigid so that it may support relatively wide filter beds while itself being supported only by the header.

Additionally, when the filter cells are relatively small, it has been found that the corrugated nature of plate 24 provides sufficient rigidity to the plate by itself, so that it is not necessary to provide additional support in any form. In such cases, air header 26 may be built with lighter pipe and spaced a distance below corrugated plate 24.

Turning to FIGS. 3 and 4, a detailed view of one air header 26 supporting corrugated filter bed support plate 24 is shown. The lower surface of corrugated plate 24 defines a plurality of channels 30, the base portions 31 of channels 30 being mounted on the top of air header 26. In order to provide fluid communication between upper and lower tank chambers 35, 36, tubular extensions 38 are mounted in and pass through plate 24. Each extension has an axial passage formed therein and upper and lower fluid ports 40, 42 respectively communicating with the passage, and is open at its lower end.

The header is provided with air outlets, such as nipples 27, through which the air exits into the lower tank chamber. Nipples 27 are located adjacent to corrugated plate 24 in a manner such that they extend into channels 30 defined by the lower surface of the corrugated plate. During the reverse flow backwashing of the filter, air exits from header 26 through nipples 27 and is conducted in a uniform fashion through channels 30 over the bottom surface of corrugated plate 24. The air is transmitted into the upper tank chamber through tubular extensions 38 and, due to its uniform distribution through channels 30, is uniformly distributed over the horizontal cross section of the filter bed. Thus, by virtue of channels 30, the need for secondary air pipes previously necessary to provide uniform backwash air distribution over the filter bed is eliminated.

As mentioned hereinabove, another feature of the present invention is that the number of relatively expensive, mechanical valves and complementary instrumentation, which control the liquid flow of the filter and backwash liquid is reduced from four to two per filter cell in comparison to conventional liquid filters of this type. Again referring to FIGS. 1 and 2, a flume 44 for the influent filter liquid is preferably provided on the outside of and integral with the tank side walls 18 at a height somewhat above the top of filter bed 22. Openings 46 define influent filter liquid inlets and fluidly interconnect the interior of tank upper chamber 34 and flume 44. Float-type valves 48 having raised seats 50 adapted to sealingly engage openings 46 are pivotally attached, as by pins 52, directly beneath each opening 46. Backwash launders or troughs 54 are provided in upper tank chamber 34 having upper edges somewhat above the level of openings 46, for reasons which will become clearer hereinbelow.

An outlet pipe 56 for the effluent filtered liquid passes through tank side wall 18 into lower tank chamber 36 and, similarly, inlet pipes 58 and 68 (which leads to header 26) for influent backwash liquid and air respectively are provided. Main supply pipes 60, 62 carry the influent backwash liquid and air to be supplied to header 26, respectively, and are located adjacent to the liquid filter and may be enclosed within an integral, housing 64, a portion of which is shown in FIGS. 1 and 2.

In the filtering operation, the influent filter liquid travels through flume 44 and is dispensed over filter bed 22 through opening 46 passing float valve 48 which is normally open. The filter liquid passes through filter bed 22, the solid impurities entrained therein being removed by the filter media. The filtered liquid passes into lower tank chamber 36 through tubular extensions 38 and exits through the effluent filter liquid outlet pipe 56.

In the reverse-flow backwashing of the filter bed, the influent backwash fluid which may include backwash liquid, such as water, introduced through inlet pipe 58, and air introduced through header 26 passes from lower tank chamber 36 into upper tank chamber 34 through tubular extensions 38, and moves upwardly through filter bed 22 dislodging and cleaning the particulate filter media. When the backwash fluid level increases within upper tank chamber 34 over the level of the liquid in the influent flume 44, the float valves 48 are automatically closed, their buoyancy causing them to pivot so that the raised seats 50 pivot into sealing arrangement within openings 46. The backwash fluid level continues to rise until the fluid (containing the impurities dislodged from the filter bed) overflows into backwash trough 54 from where it is directed to a backwash launder pipe 66 (FIG. 1).

As mentioned hereinabove, in prior liquid filters of this type, mechanical control valves were necessary to control the flow of influent filter liquid into the tank upper chamber and to control the flow of the effluent backwash fluid. However, by the construction described above, both these valves may be eliminated. This results from the fact that the backwash troughs 54 are located at a level higher than the level of the liquid in the cell during filtration. Thus, as the backwash fluid level rises, the float valves are automatically self-closed thereby prohibiting the introduction of dirty backwash water in the raw water influent flume.

Referring now to FIGS. 5 through 8, a liquid filter of generally the same type as discussed above and incorporating the valve system and structural air header features of the present invention is shown. Thus, elements in this embodiment will be designated by the same numerals as identical or corresponding elements shown in FIGS. 1 through 4, primed.

Figure 5:
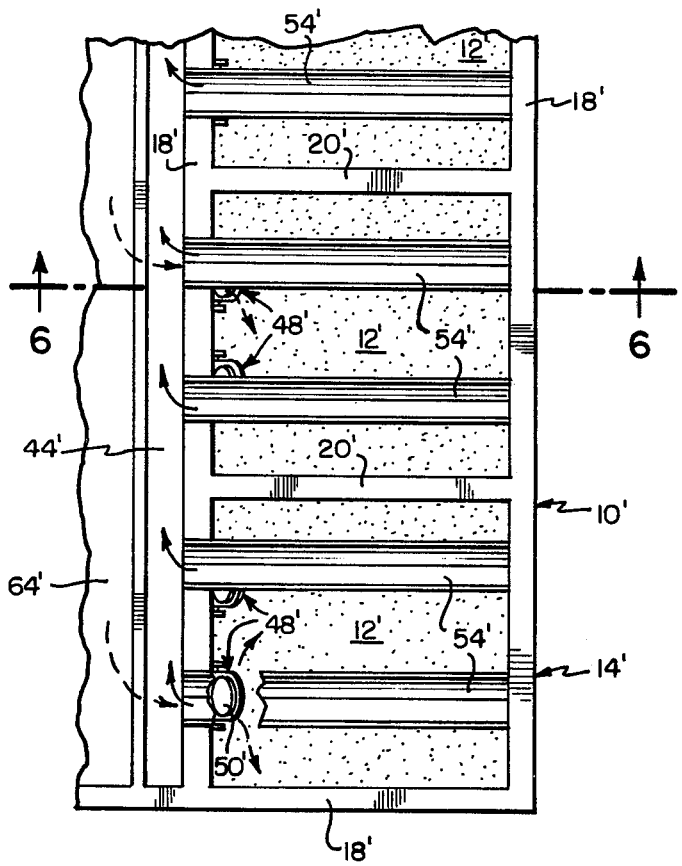
FIG. 5 is a plan view, partially broken away, of another embodiment of a liquid filter according to the present invention.
Figure 6:
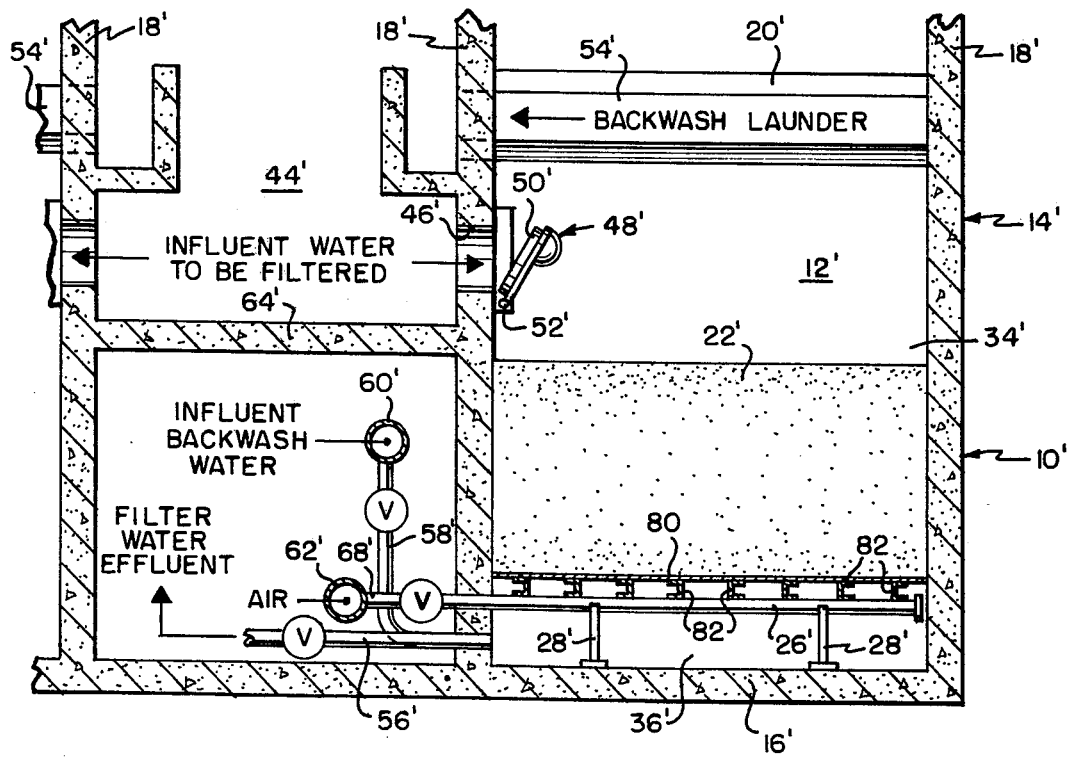
FIG. 6 is a section view taken along line 6—6 of FIG. 5.

Another embodiment of a filter bed support assembly is incorporated in the liquid filter 10' illustrated in FIGS. 5-8. As seen in FIGS. 5 and 6, influent backwash liquid and air inlet pipes 58' and 68' communicate with the lower tank chamber 36' and, similarly, an effluent filter liquid outlet pipe 56' is provided. An influent filter liquid flume 44' directs filter liquid through openings 46' past float valves 48' and over filter bed 22'. The filtering and reverse flow backwashing operations are substantially the same in the use of liquid filter 10' as was described in connection with the liquid filter 10 shown in FIGS. 1-4, the effluent backwash fluid being removed by backwash troughs 54'.

Referring to FIGS. 6-8, a filter bed support plate 80 having a substantially planar configuration is provided and is supported by a series of relatively small, light beams 82, preferably having a channel shape cross-section, which themselves are preferably supported by at least one header 26' which is mounted on support columns 28'. Header 26' may be provided with perforations 84 in its wall in lieu of nipples 27 as shown in FIGS. 3 and 4 in the previously described embodiment as will be understood by those skilled in the art. Although several horizontally extending support light beams are used in this embodiment, the support structure for the filter bed support plate 80 is still much lighter and less expensive than conventional apparatus in present use because of the use of the air header as air pipe and as a structural beam.

As seen in FIG. 7, header perforations 84 are provided inbetween beams 82. Adjacent pairs of beams 82 in cooperation with the lower surface of support plate 80 define channels 88 which transverse the underside of support plate 80. Thus, in a similar manner as in the embodiment shown in FIGS. 1-14 4 and described above, during the reverse flow backwashing of the filter, air exits from header 26' through perforations 84 and is conducted in a uniform fashion through channels 88 over the bottom surface of support plate 80.

The use of the air headers as support elements for the filter bed support plate has been found to substantially reduce the cost of manufacturing liquid filters of the type described hereinabove. The simplification in both design and construction resulting from such use is substantial.

Obviously, numerous modifications and variations of the present invention are possible in the light of the above teachings. It is therefore to be understood that within the scope of the appended claims the invention may be practiced otherwise and as specifically described herein. What is claimed is:

1. A filter for cleaning a flow of liquid, said filter comprising:
   a filter tank having upper and lower chambers;
   a fluid inlet assembly communicating with said lower tank chamber, said inlet assembly including at least one header member within said lower chamber which extends substantially horizontally across a substantial portion of the length of one dimension of said lower chamber;
   means within said tank for supporting a filter material bed, said means dividing said tank into upper and lower chambers, said header member substantially structurally supporting said filter bed supporting means;
   means extending through said filter bed supporting means for providing fluid communication between said upper and lower tank chambers;
   a bed of filter material within said upper tank chamber having a bottom surface defined and supported by said filter bed supporting means;
   an influent filter liquid inlet communicating with said tank upper chamber;
   an effluent filter liquid outlet communicating with said tank lower chamber; and
   an effluent backwash liquid outlet communicating with said tank upper chamber.

2. A filter as recited in claim 1 wherein said filter bed supporting means includes a corrugated plate at least partially structurally supported by said header member.

3. A filter as recited in claim 2 wherein said corrugated plate includes a plurality of channel portions and said header member includes a plurality of gas outlets, each of said gas outlets adapted to direct exiting gas into one of said channel portions.

4. A filter as recited in claim 2 wherein said header member is at least partially supported by column members mounted on the bottom of the lower tank chamber.

5. A filter as recited in claim 2 wherein said corrugated plate includes a plurality of channel portions, said channel portions comprising means for facilitating an even distribution of gas dispensed by said header member over the area of said plate.

6. A filter as recited in claim 1 wherein said filter bed supporting means includes substantially horizontally extending beam members at least partially structurally supported by said header member and a substantially planar plate at least partially supported by said beam members.

7. A filter as recited in claim 6 wherein said beam members and planar plate define a plurality of air distribution channels in said lower tank chamber.

8. A filter as recited in claim 6 wherein said header member is at least partially supported by column members mounted on the bottom of the lower tank chamber.

9. A filter for cleaning a flow of liquid, said filter comprising:
- a filter tank having upper and lower chambers;
- a fluid inlet assembly communicating with said lower tank chamber,
- means within said tank for supporting a filter material bed, said means dividing said tank into upper and lower chambers;
- means extending through said filter bed supporting means for providing fluid communication between said upper and lower tank chambers;
- a bed of filter material within said upper tank chamber having a bottom surface defined and supported by said filter bed supporting means;
- a normally open influent filter liquid inlet assembly communicating with said tank upper chamber, said inlet assembly including an inlet passage and means including a pivotally mounted, buoyant valve member for automatically closing said passage upon said upper tank chamber being filled to a predetermined level with backwash fluid;
- an effluent filter liquid outlet communicating with said tank lower chamber; and
- an effluent backwash liquid outlet communicating with said tank upper chamber and located at a level within said tank which is higher than said predetermined level and the level of said influent liquid inlet passage for providing a substantially vertical flow of said backwash liquid from the bed upper surface throughout said tank.

* * * * *